(12) United States Patent
Briscombe

(10) Patent No.: US 11,803,853 B2
(45) Date of Patent: Oct. 31, 2023

(54) CONTROLLING TRANSACTIONS ON A NETWORK

(71) Applicant: Nahmii AS, Bergen (NO)

(72) Inventor: Mark Briscombe, Bangkok (TH)

(73) Assignee: NAHMII AS, Bergen (NO)

(*) Notice: Subject to any disclaimer, the term of this patent is extended or adjusted under 35 U.S.C. 154(b) by 0 days.

(21) Appl. No.: 17/052,944

(22) PCT Filed: May 6, 2019

(86) PCT No.: PCT/EP2019/061595
§ 371 (c)(1),
(2) Date: Nov. 4, 2020

(87) PCT Pub. No.: WO2019/211494
PCT Pub. Date: Nov. 7, 2019

(65) Prior Publication Data
US 2021/0365948 A1    Nov. 25, 2021

(30) Foreign Application Priority Data
May 4, 2018  (GB) .................................... 1807389

(51) Int. Cl.
*G06Q 20/40* (2012.01)
*G06Q 20/06* (2012.01)

(52) U.S. Cl.
CPC ....... *G06Q 20/4016* (2013.01); *G06Q 20/065* (2013.01); *G06Q 20/405* (2013.01); *G06Q 20/4014* (2013.01)

(58) Field of Classification Search
None
See application file for complete search history.

(56) References Cited

U.S. PATENT DOCUMENTS

| | | | |
|---|---|---|---|
| 10,824,759 B1 * | 11/2020 | Magerkurth | H04L 67/104 |
| 2016/0260169 A1 * | 9/2016 | Arnold | G06Q 20/381 |
| 2017/0132626 A1 | 5/2017 | Kennedy | |
| 2017/0287068 A1 | 10/2017 | Nugent | |
| 2017/0317997 A1 * | 11/2017 | Smith | G06Q 20/3829 |
| 2018/0025442 A1 * | 1/2018 | Isaacson | H04L 51/48 705/26.62 |
| 2018/0145836 A1 * | 5/2018 | Saur | G06Q 20/3829 |

(Continued)

FOREIGN PATENT DOCUMENTS

WO    WO-2016141361 A1 *    9/2016    ......... G06F 16/2282

*Primary Examiner* — Bruce I Ebersman
*Assistant Examiner* — Matthew Cobb
(74) *Attorney, Agent, or Firm* — COATS & BENNETT, PLLC

(57) ABSTRACT

A network configured to perform a method of controlling transactions thereon is described. The network includes a first set of nodes, a second set of nodes, a server, a first agent, and a second agent. The server originates a transactional record. The first agent is receives a request to execute a transaction defined by the transactional record. At least one node of the second set of nodes validates, at least in part, the transaction, and decides a first result and a second result related to completeness and correctness, respectively, of data related to the transaction. The first agent queries, to the second agent, the first result and/or the second result, and permits the request to execute the transaction based, at least in part, on the first result and/or the second result.

18 Claims, 10 Drawing Sheets

(56) References Cited

U.S. PATENT DOCUMENTS

2019/0180266 A1\* 6/2019 Sidhu .................... H04L 63/102
2019/0199515 A1\* 6/2019 Carver ................... G06Q 20/02
2019/0354518 A1\* 11/2019 Zochowski ......... G06F 16/2379

\* cited by examiner

CONTROLLING TRANSACTIONS ON A NETWORK

BACKGROUND

Technical Field

The present invention relates generally to the field of computers and computer devices. More particularly, the present invention relates to controlling transactions on a network.

Related Art

Generally, smart contracts are computer-implemented protocols designed to digitally facilitate, verify, and/or enforce negotiation and/or execution of contracts. Particularly, smart contracts allow the execution of transactions without third party control. These transactions are trackable and irreversible. Generally, the transactions are added to blockchains. A blockchain (also known as block chain) is a linked list of records (also known as blocks), which are linked and secured cryptographically. In use, a length of the blockchain increases monotonically as new blocks are added serially (i.e. sequentially, subsequently) to the blockchain. Each block typically includes a cryptographic hash of the previously-added block, a timestamp and transaction data. The blockchain is intended to be inherently resistant to modification of the transaction data. For use as a distributed ledger by a smart contract, the blockchain is typically managed by a peer-to-peer network of nodes, which conforms to a protocol for inter-node communication and on-chain validation of new blocks (i.e. new transactional records related to new transactions). Once included on the blockchain, the transaction data in a particular block cannot be modified (i.e. retrospectively) without modification of all serially-added blocks. Such retrospective modification requires collusion of a majority the peer-to-peer network.

A problem arises in that creation and/or validation of new transactional records related to new transactions increases loading of the network while being a rate determining step, thereby reducing efficiency. This is due, at least in part, to the internode communication required to ensure that only legitimate or trusted transactions are executed by the smart contract and added to the blockchain. Particularly, a general objective is to prevent execution of illegitimate or untrusted transactions so as to also maintain security and/or integrity of the blockchain. Such illegitimate or untrusted transactions may be fraudulent and/or malicious, for example, designed to introduce attack vectors on to the blockchain. In addition, available resources of the network required to create and/or validate the new transactional records may further limit a rate at which the new transactional records may be created and/or validated. This may be exacerbated since the new transactional records are added only serially to the blockchain.

Hence, there is a need to increase an efficiency of such a network while preventing execution of illegitimate or untrusted transactions and/or their addition to a blockchain, for example.

The example embodiments have been provided with a view to addressing at least some of the difficulties that are encountered in current computer systems, whether those difficulties have been specifically mentioned above or will otherwise be appreciated from the discussion herein.

SUMMARY

According to the present invention there is provided a computer network, a computer-implemented method, and a computer-readable storage medium as set forth in the appended claims. Additional features will be appreciated from the dependent claims, and the description herein.

In one example, there is provided a network configured to perform a method of controlling transactions thereon, the network including a first set of nodes, a second set of nodes, a server, a first agent and a second agent, wherein the server is accessible by the first set of nodes and the second set of nodes and wherein the first agent and the second agent are provided by the second set of nodes, the method being implemented, at least in part, by hardware of the server including at least a processor and a memory; wherein the server is configured to originate a transactional record, wherein the transactional record defines a transaction between a first node and a second node of the first set of nodes; wherein the first agent is configured to receive a request to execute the transaction defined by the transactional record; wherein at least one node of the second set of nodes is configured to validate, at least in part, the transaction, comprising: determining, by the at least one node of the second set of nodes, completeness of data relating to the transaction by accessing the data from the server and deciding, at least in part, a first result according to the accessed data; and verifying, by the at least one node of the second set of nodes, correctness of the data relating to the transaction by accessing the data from the server and deciding, at least in part, a second result of the verifying according to the accessed data; wherein the first agent is configured to query, to the second agent, the first result and/or the second result; wherein the second agent is configured to obtain the first result and/or the second result from the second set of nodes, in response to the query; and wherein the first agent is configured to permit the request to execute the transaction defined by the transactional record based, at least in part, on the first result and/or the second result.

In one example, the server is configured to create the transactional record and wherein the first node and/or the second node of the first set of nodes is configured to transmit the request to the first agent to execute the transaction defined by the transactional record.

In one example, the first agent is configured to deny the request to execute the transaction defined by the transactional record if the first result comprises incompleteness of the data relating to the transaction and to establish a finding of data unavailability for the transaction.

In one example, the first agent is configured to deny the request to execute the transaction defined by the transactional record if the second result comprises incorrectness of the data relating to the transaction and to establishing a finding of fraud for the transaction.

In one example, a first threshold number of nodes of the second set of nodes is configured to substantiate the completeness of the data relating to the transaction.

In one example, a second threshold number of nodes of the second set of nodes is configured to prove and/or disprove the correctness of the data relating to the transaction.

In one example, the first agent is configured to set a limit for validating the transaction, in response to receiving the request to execute the transaction defined by the transactional record and wherein the at least one node of the second set of nodes is configured to validate the transaction limited by the limit.

In one example, the first agent is configured to execute the transaction defined by the transactional record.

In one example, the first agent is configured to perform a remedial action based, at least in part, on the first result and/or the second result.

In one example, the server is configured to publish the data relating to the transaction.

In one example, there is provided a method of controlling transactions on a network including a first set of nodes, a second set of nodes, a server, a first agent and a second agent, wherein the server is accessible by the first set of nodes and the second set of nodes and wherein the first agent and the second agent are provided by the second set of nodes, the method being implemented, at least in part, by hardware of the server including at least a processor and a memory, the method comprising: originating, from the server, a transactional record, wherein the transactional record defines a transaction between a first node and a second node of the first set of nodes; receiving, by the first agent, a request to execute the transaction defined by the transactional record; validating, by at least one node of the second set of nodes, at least in part, the transaction, comprising: determining, by the at least one node of the second set of nodes, completeness of data relating to the transaction by accessing the data from the server and deciding, at least in part, a first result according to the accessed data; and verifying, by the at least one node of the second set of nodes, correctness of the data relating to the transaction by accessing the data from the server and deciding, at least in part, a second result of the verifying according to the accessed data; querying, by the first agent to the second agent, the first result and/or the second result, whereupon obtaining, by the second agent, the first result and/or the second result from the second set of nodes; and permitting, by the first agent, the request to execute the transaction defined by the transactional record based, at least in part, on the first result and/or the second result.

In one example, originating the transactional record comprises creating, by the server, the transactional record and transmitting, by the first node or the second node of the first set of nodes, the request to execute the transaction defined by the transactional record.

In one example, the method comprises denying, by the first agent, the request to execute the transaction defined by the transactional record if the first result comprises incompleteness of the data relating to the transaction and establishing, by the first agent, a finding of data unavailability for the transaction.

In one example, the method comprises denying, by the first agent, the request to execute the transaction defined by the transactional record if the second result comprises incorrectness of the data relating to the transaction and establishing, by the first agent, a finding of fraud for the transaction.

In one example, determining, by the at least one node of the second set of nodes, completeness of the data relating to the transaction by accessing the data from the server comprises substantiating, by a first threshold number of nodes of the second set of nodes, the completeness of the data relating to the transaction.

In one example, the method comprises verifying, by the at least one node of the second set of nodes, correctness of the data relating to the transaction by accessing the data from the server comprises proving and/or disproving, by a second threshold number of nodes of the second set of nodes, the correctness of the data relating to the transaction.

In one example, the method comprises setting, by the first agent, a limit for validating the transaction, in response to receiving the request to execute the transaction defined by the transactional record and wherein validating the transaction is limited by the limit.

In one example, the method comprises executing, by the first agent, the transaction defined by the transactional record.

In one example, the method comprises performing, by the first agent, a remedial action based, at least in part, on the first result and/or the second result.

In one example, there is provided a tangible non-transient computer-readable storage medium having recorded thereon instructions which, when implemented by a computer device, cause the computer device to be arranged as set forth herein and/or which cause the computer device to perform any of the methods as set forth herein.

BRIEF DESCRIPTION OF THE DRAWINGS

For a better understanding of the invention, and to show how example embodiments may be carried into effect, reference will now be made to the accompanying drawings in which.

DETAILED DESCRIPTION

The following description includes example embodiments of a mechanism for controlling transactions on a network N. In at least some examples, the mechanism increases efficiency of performing transactions while upholding security. Many other advantages and improvements will be appreciated from the discussion herein.

Figure 1:
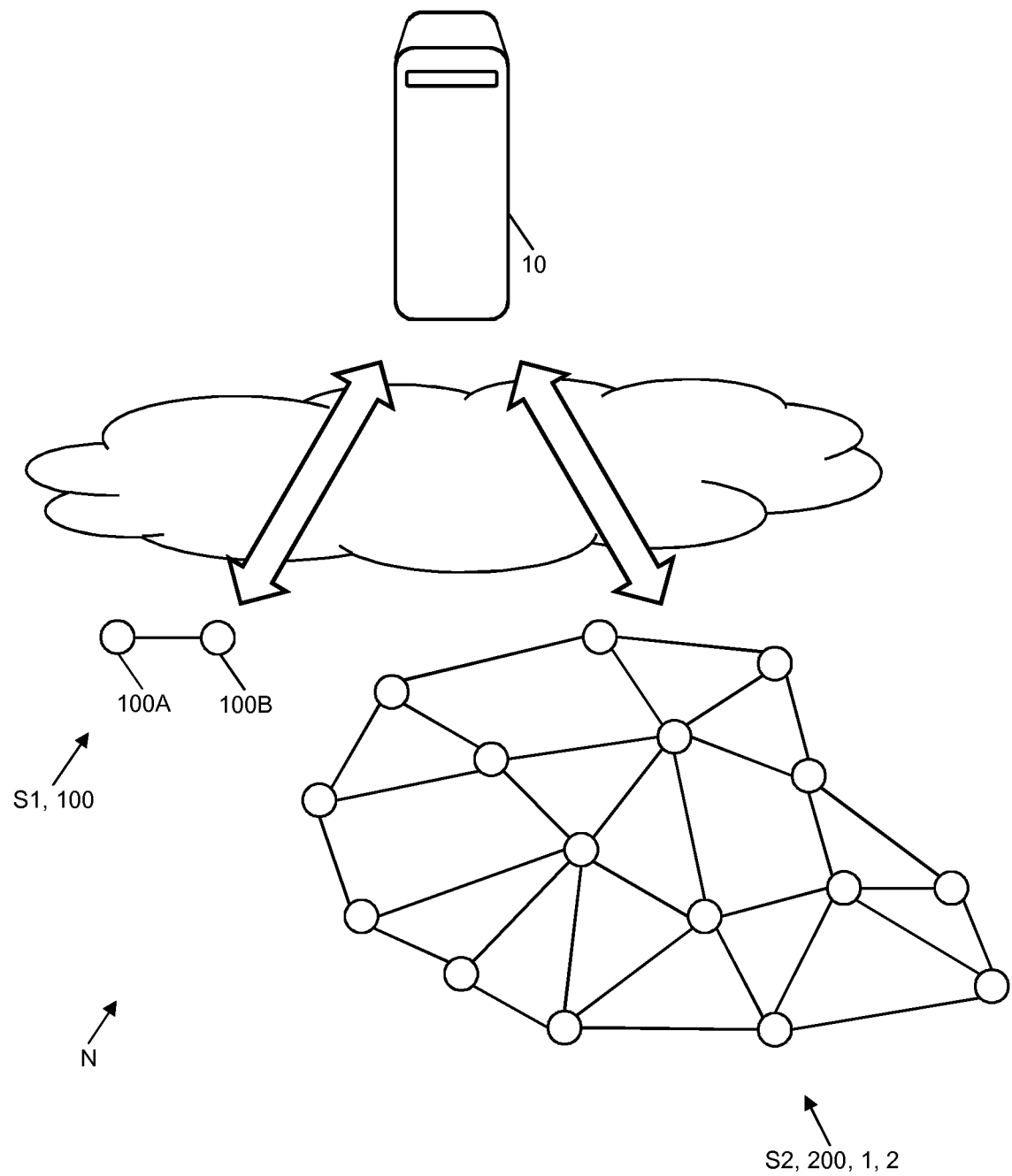
FIG. 1 is a schematic view of an example network including an example computer device.

FIG. 1 is a schematic view of an example network N. Particularly, the network N is configured to perform a method of controlling transactions thereon. Origination, for example creation, of the transactions and execution of the transactions are partitioned (also known as separated or uncoupled), so as to increase efficiency by reducing load on the network N. However, to better protect against illegitimate or untrusted transactions, the transactions are validated on the network N prior to execution, thereby upholding security. Execution of the transactions, for example by smart contracts, may add the transactions to blockchains. Thus, it is undesirable to add illegitimate or untrusted transactions to such blockchains, the security and/or integrity of which would be otherwise compromised. In this way, the efficiency of performing transactions may be increased, allowing an increased number of transactions to be performed and/or reduction of resources, while illegitimate or untrusted transactions may be denied, thereby upholding security.

In more detail, the network N includes a first set S1 of nodes 100, a second set S2 of nodes 200, a server 10, a first agent 1 and a second agent 2, wherein the server 10 is accessible by the first set S1 of nodes 100 and the second set S2 of nodes 200 and wherein the first agent 1 and the second agent 2 are provided by the second set S2 of nodes 200. It should be understood that the second set S2 of nodes 200 provides a peer-to-peer network N, as described above. It should be understood that the peer-to-peer network N excludes the server 10. In one example, the first set S1 of nodes 100 and the second set S2 of nodes 200 are mutually exclusive. In one example, the first set S1 of nodes 100 comprises and/or is a subset of the second set S2 of nodes 200. In one example, the network N includes a third set S2 of nodes 300 (not shown), as described below.

The server 10 is configured to originate a transactional record, wherein the transactional record defines a transaction TR between a first node 100A and a second node 100B of the first set S1 of nodes 100. In this way, the server 10 may manage the transaction, for example more efficiently and/or effectively. However, such a server 10 may be considered inherently untrusted by the peer-to-peer network N (i.e. the second set S2 of nodes 200). For example, the server 10 may be considered inherently untrusted because the peer-to-peer network N excludes the server 10. For example, the server 10 may be considered inherently untrusted because the transactions originating from the server 10 may be illegitimate or untrusted. For example, the server 10 may be considered inherently untrusted because the server 10 may be party to a data withholding attack, in which data relating to a transaction TR are incomplete. The data relating to the transaction TR are incomplete if at least some data, for example a part of a block, are unavailable from the server 10 (i.e. missing) such that the block is invalid. Additionally and/or alternatively, the data may relate to and/or be, for example, a list item from a list of transactions, such as consecutive transactions, or the block may be part of a Merkle tree. Such a transaction TR should not be executed and/or added to a blockchain. For example, the server 10 may be considered inherently untrusted because the server 10 may be party to a data fraud attack, in which data relating to a transaction TR are incorrect. The data relating to the transaction TR are incorrect if at least some data, for example a part of a block, are invalid, for example a post-state root is wrong or the part of block is mal-formatted, such that the block is invalid). Such a transaction TR should also not be executed and/or added to a blockchain. The inventors have determined that trust of the server 10 maybe restored and/or mitigated by validating transactions as described below.

Particularly, the first agent 1 is configured to receive a request to execute the transaction TR defined by the transactional record. At least one node of the second set S2 of nodes 200 is configured to validate, at least in part, the transaction. Validation of the transaction TR relates to completeness (i.e. availability, particularly full or entire availability) and correctness of data relating to the transaction. Validation comprises determining, by the at least one node of the second set S2 of nodes 200, completeness of data relating to the transaction TR by accessing the data from the server 10 and deciding, at least in part, a first result according to the accessed data and verifying, by the at least one node of the second set S2 of nodes 200, correctness of the data relating to the transaction TR by accessing the data from the server 10 and deciding, at least in part, a second result according to the accessed data. In one example, the validation comprises verifying, by the at least one node of the second set S2 of nodes 200, the correctness of the data relating to the transaction TR by accessing the data from the server 10 and deciding, at least in part, the second result of the verifying according to the accessed data, if the first result comprises completeness of the data relating to the transaction. The first agent 1 is configured to query, to the second agent 2, the first result and/or the second result. The second agent 2 is configured to obtain the first result and/or the second result from the second set S2 of nodes 200, in response to the query. The first agent 1 is configured to permit the request to execute the transaction TR defined by the transactional record based, at least in part, on the first result and/or the second result.

It should be understood that the server 10 is configured to originate the transactional record, for example to create the transactional record and/or act as an intermediary, whereby the transactional record is created elsewhere (for example, by the first node 100A or the second node 100B of the first set S1 of nodes 100).

In one example, the first agent 1 is configured to query, to the at least one node of the second set S2 of nodes 200, the first result and/or the second result and to obtain the the first result and/or the second result therefrom. In one example, the first agent 1 is configured to obtain the first result and/or the second result from the at least one node of the second set S2 of nodes 200, for example by monitoring a message, a transmission and/or a broadcast, including the first result and/or the second result, from the at least one node of the second set S2 of nodes 200. For example, any node, such as the at least one node of the second set S2 of nodes 200, may provide proof to the first agent 1 that the data are incorrect, such that the second result comprises incorrectness of the data relating to the transaction i.e. the at least one node of the second set S2 of nodes 200 may forward the second result to the first agent 1, for example during a predetermined period such as a dispute period. Once the predetermined period has expired, for example during which the first agent 1 did not receive any second result, the first agent 1 may then query, to the second agent 2, the first result before permitting the request to execute the transaction TR defined by the transactional record.

In this way, an efficiency of the network N is increased while execution of illegitimate or untrusted transactions and/or their addition to a blockchain, for example, is prevented.

Network N

The network N may comprise and/or be a private network N, a virtual private network N, an intranet, a cloud, or the Internet, and/or a part thereof. In one example, the second set S2 of nodes 200 comprises, is and/or provides a peer-to-peer network of nodes.

Nodes

A node is provided by, comprises and/or is one or more computer devices including at least a processor and a memory. For example, the node may be provided by, comprise and/or be a physical computer device or a virtual computer device, and/or a user thereof (also known as a participant or observer, depending on the context). The user may be a human or a non-human (i.e. programmatic, service) user, a logged-in user, for example a logged-in human user, a registered user or an anonymous user (i.e. different types of user). The first set S1 of nodes 100 and the second set S2 of nodes 200 may include a mixture of these different types of user. The first set S1 of nodes 100 and the second set S2 of nodes 200 are logical respective arrangements of the respective nodes thereof and these logical arrangements may be rearranged.

In one example, the first set S1 of nodes 100 includes two or more nodes. In one example, the first set S1 of nodes 100 includes only two nodes. In one example, the second set S2 of nodes 200 includes two or more nodes. In one example, the second set S2 of nodes 200 includes at least 10 nodes, at least 100 nodes, at least 1,000 nodes, at least 10,000 nodes, at least 100,000 nodes or at least 1,000,000 nodes.

In one example, the at least one node of the second set S2 of nodes 200 is configured to determine the completeness of the data relating to the transaction TR by accessing the data from the server 10 by requesting some or all of the data relating to the transaction TR from the server 10 and confirming that the requested data are available therefrom. The first result comprises completeness of the data relating to the transaction if the requested data are available and the first result comprises incompleteness of the data relating to the transaction otherwise. In one example, the at least one node of the second set S2 of nodes 200 is configured to verify the correctness of the data relating to the transaction TR by accessing the data from the server 10 by requesting some or all of the data relating to the transaction TR from the server 10 and confirming that the requested data are valid. The second result comprises correctness of the data relating to the transaction if the requested data are valid and the first result comprises incorrectness of the data relating to the transaction otherwise. In one example, In one example, the at least one node of the second set S2 of nodes 200 is configured to verify the correctness of the data relating to the transaction TR by accessing the data from the server 10 and forwarding the accessed data to the first agent 1 for verification. In one example, a first threshold number of nodes of the second set S2 of nodes 200 is configured to substantiate the completeness of the data relating to the transaction.

In one example, a second threshold number of nodes of the second set S2 of nodes 200 is configured to prove and/or disprove the correctness of the data relating to the transaction. In one example, the second threshold number of nodes of the second set S2 of nodes 200 is one. That is, it may be sufficient for a single node to disprove the correctness of the data relating to the transaction whereby the first agent denies the request to execute the transaction defined by the transactional record.

First Agent

The first agent 1 is provided by the second set S2 of nodes 200 and is a decentralized platform for applications, for example for smart contracts on blockchains. Examples of first agents 1 include Bitcoin, Ethereum, Bitcoin Cash, Ripple, Stellar, Litecoin, Cardano, NEO and EOS. Ethereum is preferred.

In one example, the first agent 1 is configured to deny the request to execute the transaction TR defined by the transactional record if the first result comprises incompleteness of the data relating to the transaction TR and to establish a finding of data unavailability for the transaction. In one example, the first agent 1 is configured to confirm the first result before permitting or denying the request to execute the transaction TR defined by the transactional record, by querying, for example repeatedly, to the second agent, the first result. For example, the first agent 1 may always check data were available (i.e. the first result comprises completeness of the data relating to the transaction TR) before finalising any settlement or transactional settlement (i.e. executing the transaction TR defined by the transactional record). In one example, the first agent 1 is configured to verify the correctness of the data relating to the transaction TR.

In one example, the first agent 1 is configured to deny the request to execute the transaction TR defined by the transactional record if the second result comprises incorrectness of the data relating to the transaction TR and to establishing a finding of fraud for the transaction. For example, the first agent 1 may be configured to perform a remedial action, as described below, in response to or immediately in response to establishing the finding of fraud for the transaction.

In one example, the first agent 1 is configured to set a limit for validating the transaction, in response to receiving the request to execute the transaction TR defined by the transactional record and wherein the at least one node of the second set S2 of nodes 200 is configured to validate the transaction TR limited by the limit. For example, the first agent 1 may start a dispute timer and validation may be performed while the dispute timer is running.

In one example, the first agent 1 is configured to execute the transaction TR defined by the transactional record. Upon execution of the transaction, the transaction TR may be added to a blockchain.

In one example, the first agent 1 is configured to perform a remedial action based, at least in part, on the first result (i.e. completeness or incompleteness of the data) and/or the second result (i.e. correctness or incorrectness of the data). Example remedial actions include interrupting the transaction TR such as pausing the transaction TR, suspending the transaction TR, terminating the transaction TR, and/or interrupting the server 10 such as suspending, pausing, ceasing and/or terminating the server 10 and/or alerting the suspending, pausing, ceasing and/or terminating the server 10 (for example, if the server 10 is compromised, by a malicious attack, for example). If the server 10 is compromised, the server 10 maybe migrated to new hardware or reinitialized, for example, to restore integrity thereof.

Second Agent

The second agent 2 is provided by the second set S2 of nodes 200 and is a decentralized oracle that enables the smart contracts on the blockchains to communicate with off-chain application programming interfaces (APIs) and data, for example. Other methods of communication include a subset of nodes of the second set S2 of nodes 200 which reach consensus about data availability by staking or voting, for example. Examples of second agents 2 include ChainLink, Delphi and Concurrence.

The second agent 2 is configured to receive the query from the first agent 1 for the first result and/or the second result. The second agent 2 is configured to obtain the first result and/or the second result from the second set S2 of nodes 200, in response to the query. Example queries may include "Has there been an attempted withdrawal without complete data availability?" or "Has there been an attempted withdrawal with incorrect data?" In some examples, withdrawals are permitted only after a waiting time has elapsed, for example 24 hours. The second agent 2 is configured to obtain the first result and/or the second result from the second set S2 of nodes 200, in response to the query, after a waiting time, for example, in a range from 0 hours to 168 hours, preferably in a range from 6 hours to 96 hours, more preferably in a range from 12 hours to 48 hours, for example 24 hours or 36 hours. If a response to such example queries during the waiting time is affirmative, then a data withholding attack or a data fraud attack is identified, respectively.

Transactions

In one example, the transaction TR is a balance request transaction, a deposit transaction, a withdrawal transaction, a payment validity request transaction, a payment transaction or a settlement transaction. More generally, the transaction TR may be and/or relate to a transaction or a trade that is susceptible to fraudulent and/or malicious intent, whereby the control of the transaction provided, as described herein, is advantageous, at least for the reasons as described herein.

State Channels

In one example, the transaction TR between a first node 100A and a second node 100B of the first set S1 of nodes 100 is provided via a state channel. Generally, state channels are two-way channels between nodes (also known as users or participants), for example human or non-human (i.e. programmatic, service) users, for creating (i.e. providing) transactions therebetween. The state channel may be between only two parties (i.e. the first node 100A and the second node 100B of the first set S1 of nodes 100) or more than two parties (also known as a multi party state channel, for example between more than two nodes of the first set S1 of nodes 100, including the first node 100A and the second node 100B of the first set S1 of nodes 100). The transactions are signed (for example, digitally) by the nodes, thereby preventing subsequent refuting of the transactions. Since the state channels are off-chain with respect to blockchains to which the transactions may be added, providing the transactions in this way reduces load on the network N compare with on-chain transactions. In this way, scalability of the network N may be enhanced, compared with conventional blockchains. Further, since the state channels are exclusively between the nodes, transactional privacy may be improved, compared with conventional blockchains. In one example, the server 10 is configured to operate a state channel, as described below.

In Use

In use, a transactional record originates from the server 10, wherein the transactional record defines a transaction TR between a first node 100A and a second node 100B of the first set S1 of nodes 100. The first agent 1 receives a request to execute the transaction TR defined by the transactional record. In turn, at least one node of the second set S2 of nodes 200, validates, at least in part, the transaction. Validation of the transaction TR relates to completeness and correctness of data relating to the transaction. In a first scenario, if the data are incomplete, the transaction TR may be subject to a data withholding attack, for example by the server 10. In a second scenario, if the data are incorrect, the transaction TR may be malicious, for example illegitimate or fraudulent. Execution of the transactions in such scenarios is undesired. Hence, validating, at least in part, the transaction, comprises firstly determining, by the at least one node of the second set S2 of nodes 200, completeness of data relating to the transaction TR by accessing the data from the server 10 and deciding, at least in part, a first result according to the accessed data; and secondly verifying, by the at least one node of the second set S2 of nodes 200, correctness of the data relating to the transaction TR by accessing the data from the server 10 and deciding, at least in part, a second result of the verifying according to the accessed data. The first agent 1 queries to the second agent 2, the first result and/or the second result, and in turn, the second agent 2 obtains the first result and/or the second result from the second set S2 of nodes 200. The first agent 1 permits the request to execute the transaction TR defined by the transactional record based, at least in part, on the first result and/or the second result. In other words, users (i.e. the second set S2 of nodes 200, also known as observers) monitoring the network N may check if all data are available first. If all data are available, the users will check if the data are valid. If data were unavailable, then the users may stake that "data were unavailable". The users staking that "data were unavailable" may be at least some of the second set S2 of nodes 200 and/or a third set of nodes, distinct from the first set S1 of nodes 100 and the second set S2 of nodes 200. If data were available, but incorrect, then the users will send a fraud proof. This will happen during a dispute period, for example, but the first agent 1, for example a smart contract, may instead perform this mechanism in a reverse order. If fraudulent data are provided, then the first agent 1 may perform a remedial action, for example trigger a dead man's switch, and/or as described below. Once the dispute period expires, then the settling user (for example, the first node 100A or the second node 100B of the first set S1 of nodes 100) will be able to claim their settlement of the transaction TR. However, before settling, the first agent 1, for example the smart contract, may check that the second agent 2, for example a decentralized oracle, confirms that there is no ongoing "data availability attack". If the second agent 2, for example the decentralized oracle, confirms that there is no ongoing "data availability attack", then the settlement will take place i.e. the first agent 1 will permit execution of the transaction TR. However, if the second agent 2, for example the decentralized oracle, indicates that data availability is in question, then the first agent 1 will cease the settlement and pause or end the transaction TR or take some other remedial action, for example.

Server

Figure 2:
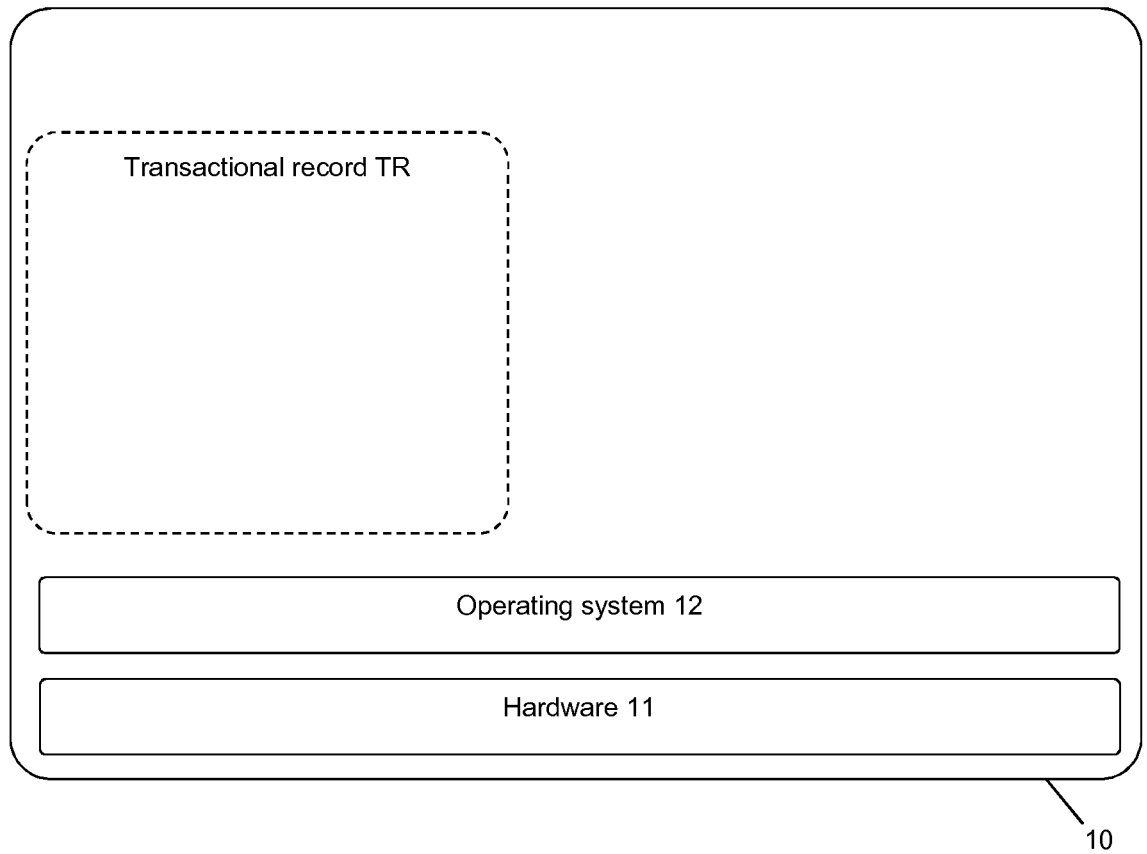
FIG. 2 is a schematic view of the example computer device in more detail.

FIG. 2 is a schematic view of the server 10, in more detail.

The server 10 may be as described with respect to a node. In one example, the server 10 and the first set S1 of nodes 100 and/or the second set S2 of nodes 200 are mutually exclusive. That is, the server 10 is not included in logical respective arrangements of the first set S1 of nodes 100 and/or the second set S2 of nodes 200, while accessible thereto. In one example, the server 10 is off-chain with respect to the first agent 1 and/or the second agent 2 (i.e. outside of the second set S2 of nodes 200).

In one example, the server 10 is configured to create the transactional record and the first node 100A and/or the second node 100B of the first set S1 of nodes 100 is configured to transmit the request to the first agent 1 to execute the transaction TR defined by the transactional record.

In one example, the server 10 is configured to operate a state channel. In this way, the server 10 may manage the transaction TR provided via the state channel, for example more efficiently and/or effectively. In one example, the server 10 is configured to store the transactional record and/or a set of transactional records, for example in a database. In one example, the server 10 is configured to store data relating to the transaction TR in association with the transactional record. In one example, the server 10 is configured to provide access to the data relating to the transaction. In one example, the server 10 is configured to retrieve the data relating to the transaction TR in response to a request, for example from a node, to access the data. In one example, the server 10 is configured to forward, for example to a node, the data relating to the transaction TR in response to a request, for example from the node, to access the data. In one example, the server 10 is configured to publish the data relating to the node, thereby enabling access to the data relating to the transaction. In one example, the server 10 is configured to sign the transaction. In one example, the server 10 is configured to countersign the transaction.

The server 10 may take any suitable form factor. As examples, the server 10 may be a desktop computer, a portable computing device, laptop, tablet, smartphone, wearable device, or an emulated virtual device on any appropriate host hardware. The server 10 comprises hardware (H/W) layer 11, which suitably includes memory, processors (CPU central processor units), I/O input/output interfaces (e.g. NIC network N interface cards, USB universal serial bus interfaces, etc.), storage (e.g. solid state non-volatile storage or hard disk drive), and so on. An operating system 12, for example Windows 10, runs on the hardware layer 11 to provide a runtime environment for execution of user processes and applications. This runtime environment typically provides resources such as installed software, system services, drivers, and files.

The server 10 includes the transactional record TR. The server 10 may include a plurality of such transactional records, for example in a database.

Node

Generally, a node may take any suitable form factor, as described above with respect to the server 10.

Operating Systems

Some of the example embodiments are discussed in detail in relation to computers and computer devices using the Windows® operating system, as supplied by Microsoft Corporation of Redmond, Wash., USA, under the trade marks Windows NT, Windows 2000, Windows XP, Windows Vista, Windows Server 10 2003, Windows Server 10 2008, Windows 7, Windows 8, Windows 10 or later versions, amongst others. However, the teachings, principles and techniques of the present invention are also applicable in other embodiments. For example, the described embodiments are also applicable to other operating systems, such as UNIX®, Linux®, mac OS®, iOS® and Android®.

Figure 3:
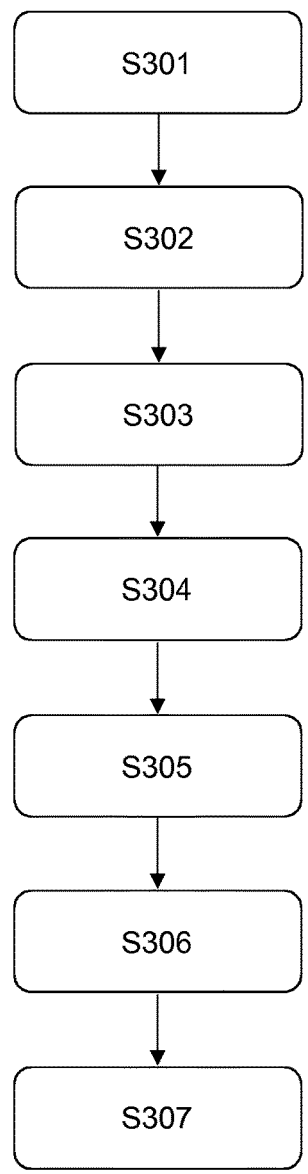
FIG. 3 is a flowchart of an example method.

FIG. 3 is a flowchart of an example method. Particularly, FIG. 3 shows a method of controlling transactions on the network N, as described above. This example method may include any of the steps described herein.

At S301, the transactional record originates from the server 10, wherein the transactional record defines a transaction TR between the first node 100A and the second node 100B of the first set S1 of nodes 100.

Optionally, originating the transactional record comprises creating, by the server 10, the transactional record and transmitting, by the first node 100A or the second node 100B of the first set S1 of nodes 100, the request to execute the transaction TR defined by the transactional record.

At S302, the first agent 1 receives a request to execute the transaction TR defined by the transactional record.

Optionally, the first agent 1 sets a limit, for example a dispute period, for validating the transaction, in response to receiving the request to execute the transaction TR defined by the transactional record, wherein validating the transaction TR is limited by the limit.

At S303, at least one node of the second set S2 of nodes 200 validates at least in part, the transaction TR, including determining completeness of data relating to the transaction TR and verifying correctness of the data relating to the transaction TR, as described below.

At S304, the at least one node of the second set S2 of nodes 200 determines completeness of data relating to the transaction TR by accessing the data from the server 10 and deciding, at least in part, a first result according to the accessed data.

Optionally, determining, by the at least one node of the second set S2 of nodes 200, completeness of the data relating to the transaction TR by accessing the data from the server 10 comprises substantiating, by a first threshold number of nodes of the second set S2 of nodes 200, the completeness of the data relating to the transaction.

At S305, the at least one node of the second set S2 of nodes 200 verifies correctness of the data relating to the transaction TR by accessing the data from the server 10 and deciding, at least in part, a second result of the verifying according to the accessed data.

Optionally, verifying, by the at least one node of the second set S2 of nodes 200, correctness of the data relating to the transaction TR by accessing the data from the server 10 comprises proving and/or disproving, by a second threshold number of nodes of the second set S2 of nodes 200, the correctness of the data relating to the transaction.

At S306, the first agent 1 queries, to the second agent 2, the first result and/or the second result, whereupon obtaining, by the second agent 2, the first result and/or the second result from the second set S2 of nodes 200. If the second result comprises incorrectness of the data, the second result may be sent directly to the first agent 1, for example a smart contract, and the the first agent 1 may immediately be able to see the error (i.e. that the second result comprises incorrectness of the data) and take remedial action automatically. One part of a remedial action may be to debit a portion of funds associated with the first node 100A or the second node 100B of the first set S1 of nodes 100, in addition to interrupting the transaction, as described herein, and rewarding the at least one node of the second set S2 of nodes 200, thereby incentivizing the validation of the transaction TR by the second set S2 of nodes 200.

At S307, the first agent 1 permits the request to execute the transaction TR defined by the transactional record based, at least in part, on the first result and/or the second result.

Optionally, the first agent 1 executes the transaction TR defined by the transactional record.

Optionally, the first agent 1 denies the request to execute the transaction TR defined by the transactional record if the first result comprises incompleteness of the data relating to the transaction TR and establishes a finding of data unavailability for the transaction. If the first result comprises incompleteness of the data, when the first node 100A or the second node 100B of the first set S1 of nodes 100 attempts to settle, withdraw and/or move the transaction TR on chain, the first agent 1 may deny, for example block, the attempt. Typically, such an attempt may be performed after a dispute period expires, for example.

Optionally, in response to the finding of data unavailability for the transaction, data unavailability staking may be performed by the second set S2 of nodes 200 on the network N. The data unavailability staking may be performed according to game theory, for example. The second agent 2 may default to a first status, for example status 'no data withholding attack is underway'. In response to the finding of data unavailability for the transaction, one or more of the second set S2 of nodes 200 may respectively stake tokens that the finding of data unavailability for the transaction TR is correct. These one or more of the second set S2 of nodes 200 (also known as stakers) risk their respective staked tokens in return for respective shares of a possible reward payable to these one or more of the second set S2 of nodes 200 if the finding of data unavailability for the transaction TR is correct. If these one or more of the second set S2 of nodes 200 respectively stake tokens that the finding of data unavailability for the transaction TR is correct and an amount of staked tokens reaches a predefined threshold (for example, one or more criteria of agreement), for example by these one or more of the second set S2 of nodes 200 supporting one or more of the remaining nodes of the second set S2 of nodes 200 (i.e. those nodes which have not, as yet, respectively staked tokens that the finding of data unavailability for the transaction TR is correct), a determination is made that a data withholding attack is underway. For example, a smart contract (i.e. the first agent 1) that accepts user staking, for example by one or more of the second set S2 of nodes 200, may make this determination. In a first example, suppose 100 users (i.e. a first threshold number of nodes of the second set S2 of nodes) are required to indicate "data unavailable". Each time users stake, then the smart contract will check how many users have said similarly. Once a total reaches 100, then the smart contract triggers a result (for example, the first result) that "data were unavailable". More generally, the first threshold may be a percentage of users and/or amount staked, for example an overall percentage or a moving average percentage, such as of the last N stakes, where N is a natural number, for example 10, 100, 1,000, 10,000, or more. In other words, if nodes support each other and the staking reaches multiple criteria of agreement, then this is considered as proof that data were unavailable and thus that the data withholding attack is underway. The reward will be available to the nodes who are good actors. Good actors may be stakers that successfully change the status of the decentralised oracle (i.e. the second agent 2) to "data unavailable", and may receive a share of the reward. This may be hard to do achieve unless a majority or even all of the other users are in agreement (also known as Sybil resistance). Additionally and/or alternatively, a reward may go back in the reverse direction. If data are made available later, then the network N may be restarted, for example unpaused. If these one or more of the second set S2 of nodes 200 (i.e. the stakers), who respectively stake tokens that the finding of data unavailability for the transaction TR is correct, succeed in changing a status of the second agent 2 from the first status to a second status, for example 'data withholding attack is underway' (i.e. the amount of staked tokens reaches the predefined threshold), these one or more nodes of the second set S2 of nodes 200 (i.e. the stakers) receive respective shares of the reward. However, if the status of the second agent 2 is unchanged (i.e. remains the first status), these one or more nodes of the second set S2 of nodes 200 (i.e. the stakers) lose their respective staked tokens.

Optionally, the first agent 1 denies, for example immediately, the request to execute the transaction TR defined by the transactional record if the second result comprises incorrectness of the data relating to the transaction TR and establishes a finding of fraud for the transaction.

Optionally, in response to the finding of fraud for the transaction, fraud proofing may be performed, for example continuously during the dispute period and/or the remaining (i.e. unelapsed) dispute period, by the second set S2 of nodes 200. For example, if one or more nodes of the second set S2 of nodes 200 observes that all the data relating to the transactional record TR were not correct, these one or more nodes of the second set S2 of nodes 200 may submit this data as proof of fraud to the first agent 1 on the network N. The first agent 1 on the network N may behave as an adjudicator (for example, a supreme court) regarding the fraud. Particularly, these one or more nodes of the second set S2 of nodes 200 may compete or race to submit this data as the proof of the fraud to the first agent 1 on the network N, so as to be the first node 100A of the second set S2 of nodes 200 to submit this data. The first node 100A of the second set S2 of nodes 200 to submit this data (i.e. evidence of fraud) may be rewarded with a part of funds seized from the second node 100B of the first set S1 of nodes 100.

Optionally, the first agent 1 performs a remedial action based, at least in part, on the first result and/or the second result.

FIGS. 4 to 10 relate to an example method, in more detail. In this example, the first agent 1 is a smart contract on an Ethereum network and the second agent 2 is a decentralized oracle. The second set S2 of nodes 200 is a peer-to-peer network of observers.

Figure 4:
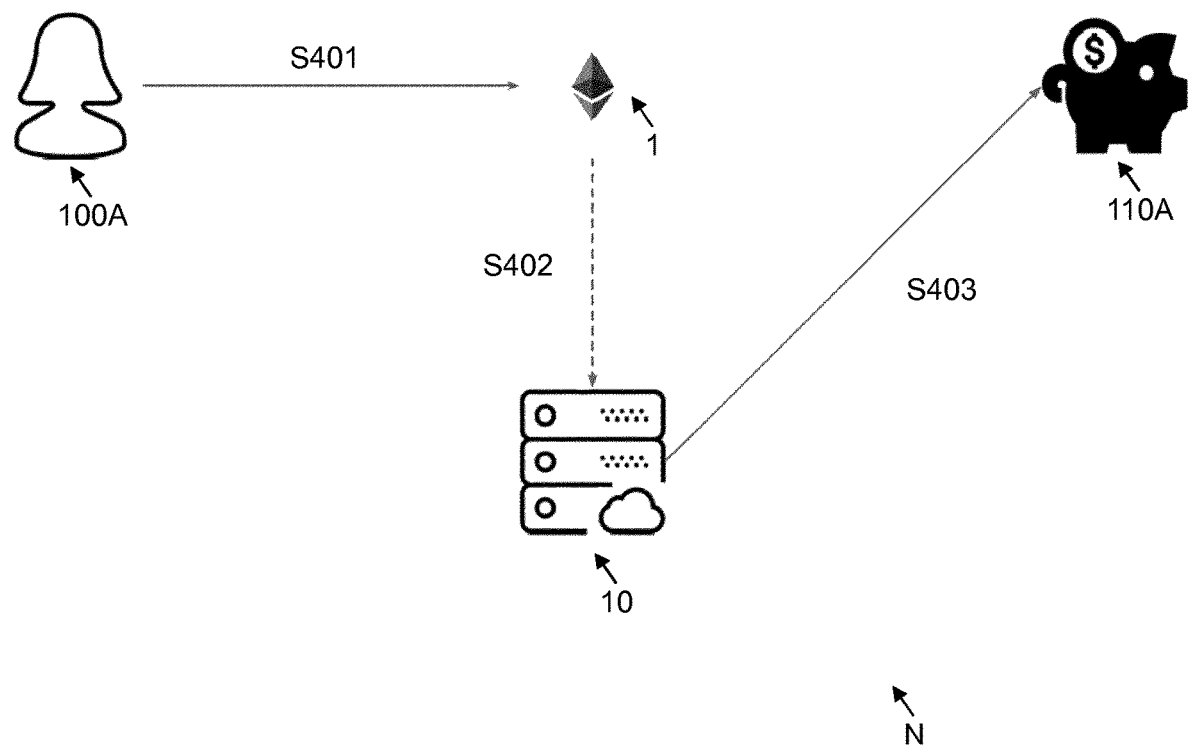
FIG. 4 is a flowchart of part of an example method, in more detail.

FIG. 4 is a flowchart of part of an example method, in more detail. Particularly, FIG. 4 relates to deposit transactions.

At S401, a deposit transaction TR1 (i.e. a first transactional record) is transmitted from a first user 100A (i.e. a first node 100A of the first set S1 of nodes 100) to a smart contract (i.e. a first agent 1) on a network N, for example the Ethereum network N.

At S402, a server 10 queries the network N, for example every transactional record or block, to identify transactional records TRs such as the deposit transaction TR1.

At S403, in response to identifying the deposit transaction TR1, the server 10 credits a first account 110A related to the first user 100A with an amount corresponding to the deposit transaction TR1.

Figure 5:
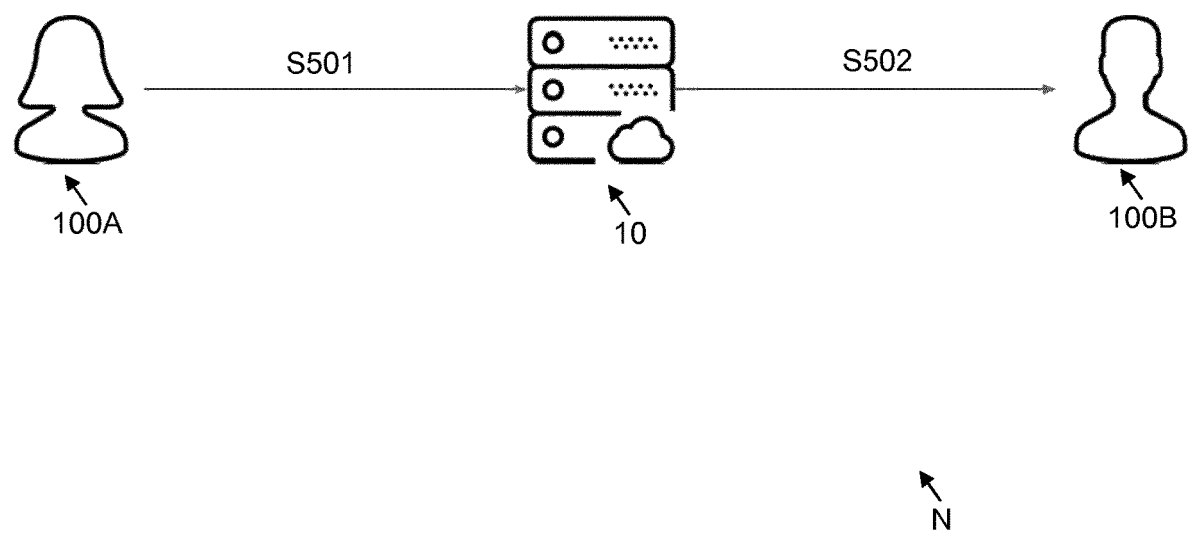
FIG. 5 is a flowchart of part of an example method, in more detail.

FIG. 5 is a flowchart of part of an example method, in more detail. Particularly, FIG. 5 relates to payment transactions.

At S501, a payment transaction TR2 (i.e. a second transactional record) is transmitted from the first user 100A to the server 10, wherein the payment transaction TR2 defines a transaction TR between the first user 100A and a second user 100B (i.e. a second node 100B of the first set S1 of nodes 100). Specifically, the payment transaction TR2 is a payment from the first user 100A to the second user 100B.

At S502, the server 10 determines whether the first account 110A, related to the first user 100A, includes sufficient funds for the payment transaction TR2. If a result of the determining is that the first account 110A, related to the first user 100A, includes sufficient funds for the payment transaction TR2, the server 10 debits an amount corresponding to the payment transaction TR2 from the first account 110A, related to the first user 100A, and credits a corresponding amount (for example, the same amount) (i.e. the amount corresponding to the payment transaction TR2) to a second account 210 (not shown), related to the second user 100B.

Figure 6:
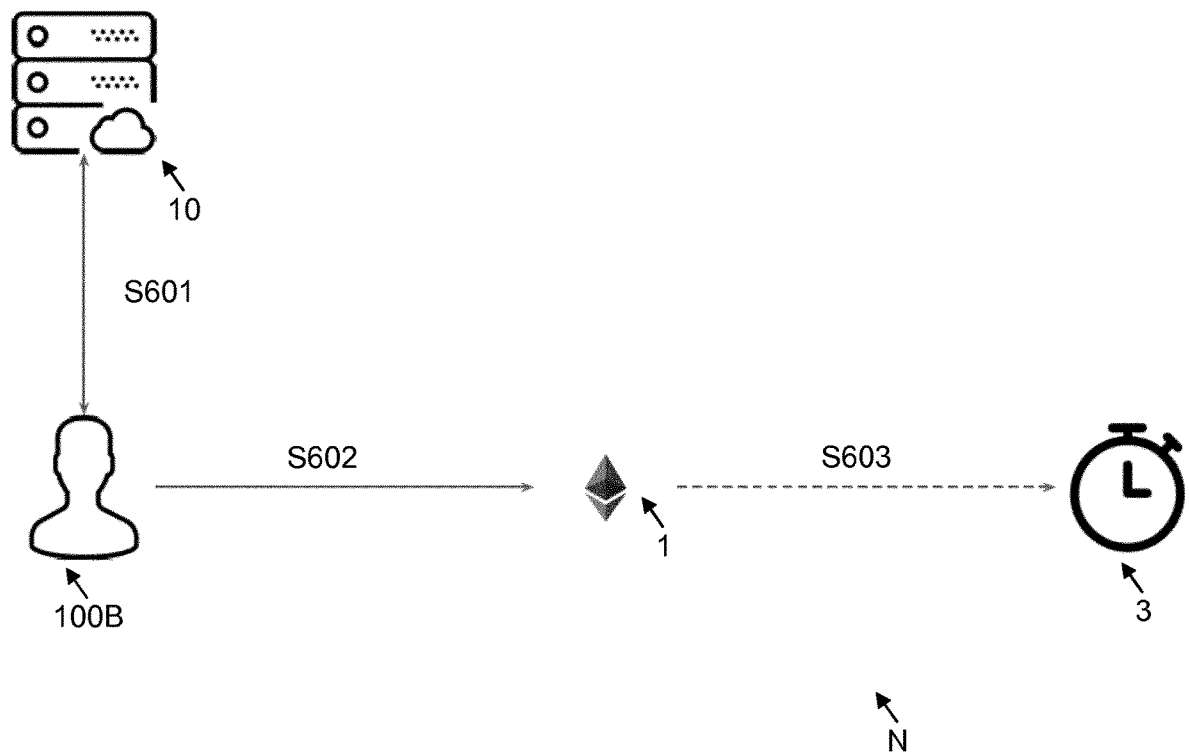
FIG. 6 is a flowchart of part of an example method, in more detail.

FIG. 6 is a flowchart of part of an example method, in more detail. Particularly, FIG. 6 relates to settlement transactions.

Generally, if the second user 100B (i.e. the second node 100B of the first set S1 of nodes 100) wants to settle a transaction, the user 100B should send the latest transaction that has been countersigned by the server 10 to the Ethereum network (i.e. the first agent 1) for processing. Settlement and withdrawal will be processed by the smart contract on the Ethereum network 1. A timer will start and if data were not available, then users 200 (i.e. the second set S2 of nodes 200) will perform "data-unavailability staking". These users 200 will also have the opportunity to send evidence of fraudulent transactions that have been published. This is how the security is performed. Particularly, there are two attack vectors which must be closed.

Attack vector 1: The user 100B submits transaction 1,000, but the user 1000B has actually performed transaction 1,001. Transaction 1,001 was a payment/trade that the user 100B wants to try to ignore/reverse. In this case, the users 200 monitoring the network N will submit transaction 1,001 and receive a reward for doing so. The user 100B will be punished.

Attack vector 2: The server 10 provides a fraudulent transaction (for example, countersigns a payment for 1000 ETH when the user 100A (i.e. the first node 100A of the first set S1 of nodes 100) actually only had 1 ETH on balance). In this case, the users 200 monitoring the network N will submit proof that the user 100A had only a balance of 1 ETH. The user 100A will be punished and the fraudulent transaction will be paused, as otherwise the first agent 1 would be compromised. Hence, the transaction TR will be prevented and the user 100A will have at last a part of and/or all funds seized and sent to the user that provided proof. In such a case, the network N and/or the server 10 has been compromised and was complicit, so remedial action will be taken, as described herein.

For both of these attack vectors, it is not possible to prove to the smart contract (i.e. the first agent 1) that an attack has occurred unless the data were available. However, it would be apparent to the users 200 monitoring the network N. This must be proved to the first agent 1, by providing evidence. Particularly, the decentralised oracle (i.e. the second agent 2) tells the smart contract (i.e. the first agent 1) if data were available. If the users 200 see that data were not available, then the users 200 may start to stake their money onto saying that it was not available.

At S601, the second user 100B requests a settlement transaction TR3 (i.e. a third transactional record) from the server 10. In response to the request, the server 10 creates (or constructs) the settlement transaction TR3 and forwards the created settlement transaction TR3 to the second user 100B. Alternatively, the second user 100B may create the settlement transaction TR3. The server 10 signs the settlement transaction TR3.

At S602, the second user 100B signs the settlement transaction TR3 and transmits the signed settlement transaction TR3 to the first agent 1 on the network N.

At S603, in response to receiving the signed settlement transaction TR3, the first agent 1 on the network N starts a dispute timer 3 (i.e. sets a limit), thereby starting a dispute period.

Figure 7:
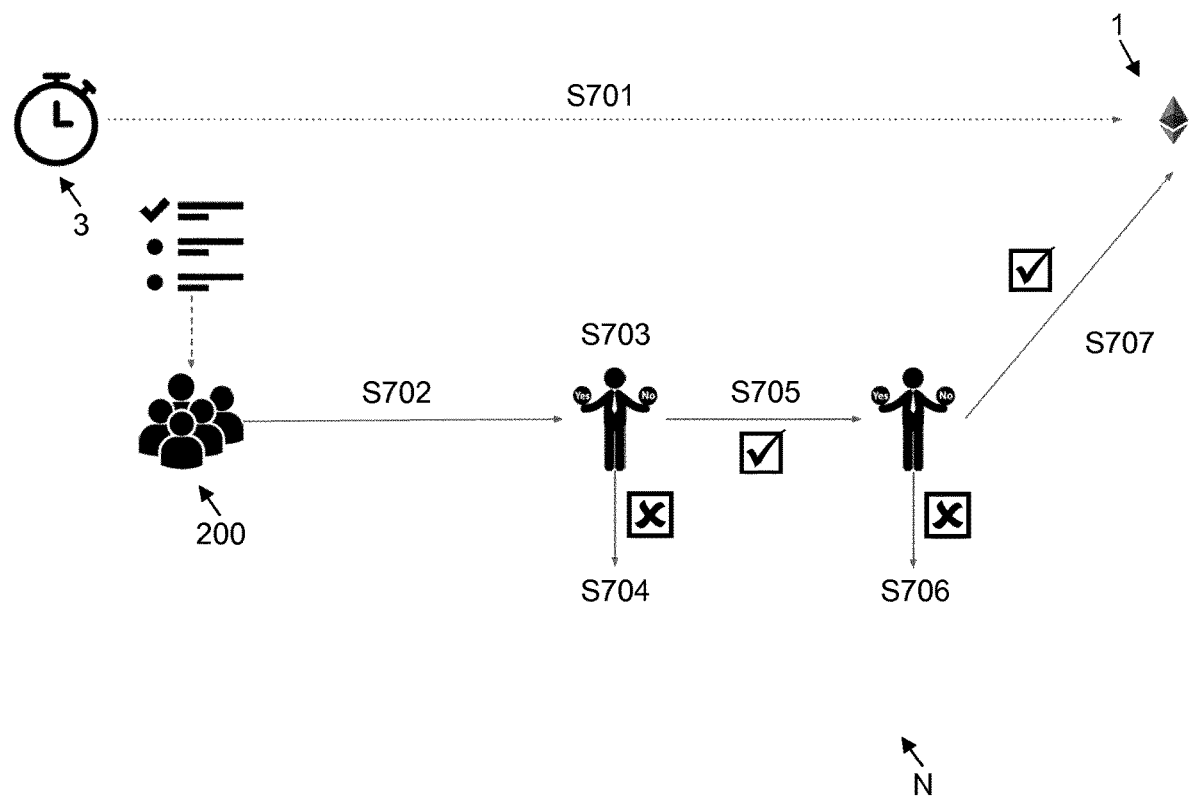
FIG. 7 is a flowchart of part of an example method, in more detail.

FIG. 7 is a flowchart of part of an example method, in more detail. Particularly, FIG. 7 relates to settlement dispute periods.

At S701, the dispute timer 3 is running (i.e. the dispute period is open, running, not terminated and/or not elapsed).

At S702, while the dispute timer 3 is running, a second set S2 of nodes 200 validates, at least in part, the settlement transaction TR3. Particularly, the second set S2 of nodes 200 validates the settlement transaction TR3 by determining a completeness and a correctness of data relating (for example, pertaining) to the settlement transaction TR3 at a time when the settlement transaction TR3 was created. That is, the determining is performed retrospectively.

At S703, the second set S2 of nodes 200 validate, at least in part, the settlement transaction TR3, by determining whether all the data relating to the settlement transaction TR3 were available and/or complete (i.e. when the settlement transaction TR3 was created). That is, at least one node of the second set S2 of nodes 200 determines completeness of the data relating to the transaction TR3 by accessing the data from the server 10.

At S704, if the second set S2 of nodes 200, for example one or more or a percentage or an amount staked, determine that all data relating to the settlement transaction TR3 were not available and/or complete, a finding of data unavailability for the transaction TR3 is made, for example by observers i.e. at least one node of the second set S2 of nodes 200 as described in more detail with reference to FIG. 8. That is, at least one node of the second set S2 of nodes 200 decides, at least in part, a first result according to the accessed data. The finding of data unavailability for the transaction TR3 of the settlement transaction TR3 is submitted to the first agent 1 on the network N.

At S705, if the second set S2 of nodes 200, for example one or more nodes thereof, determine that all data relating to the settlement transaction TR3 were available, the second set S2 of nodes 200 validate, at least in part, the settlement transaction TR3, by determining whether the data relating to the settlement transaction TR3 were correct (i.e. when the settlement transaction TR3 was created). That is, at least one node of the second set S2 of nodes 200 verifies correctness of the data relating to the transaction TR3 by accessing the data from the server 10.

At S706, if the second set S2 of nodes 200, for example only one node or more than one node thereof, determine that all data relating to the settlement transaction TR3 were not correct, a finding of fraud for the transaction TR3 is made, as described in more detail with reference to FIG. 9. That is, at least one node of the second set S2 of nodes 200 decides, at least in part, a second result of the verifying according to the accessed data. The finding of fraud for the settlement transaction TR3 is submitted to the first agent 1 on the network N. The fraud proof (i.e. the finding of fraud) may be an invalid transaction. In simple terms, the decentralized oracle on "data availability" forces the operator to publish all data all of the time. However, any fraud will therefore be published and be apparent to observers (i.e. the second set S2 of nodes 200). The smart contract (i.e. the first agent) will be able to check transaction data and so any transaction proof can be provided. There might be some special circumstances of fraud where a node/user might have to provide more than one piece of data. Perhaps a type of fraud or incorrect piece of data is only visible as a discontinuity in numbers across two different transactions. For example for two payments, a previous balance on a second (i.e. subsequent) payment should be equal to final balance on first (i.e previous) payment.

At S707, if the second set S2 of nodes 200 determine that all data relating to the settlement transaction TR3 was correct, the settlement transaction TR3 is validated (i.e. accepted) and transmitted to the smart contract on the network N for processing, as normal. That is, the first agent 1 executes the transaction TR3 defined by the transactional record.

Figure 8:
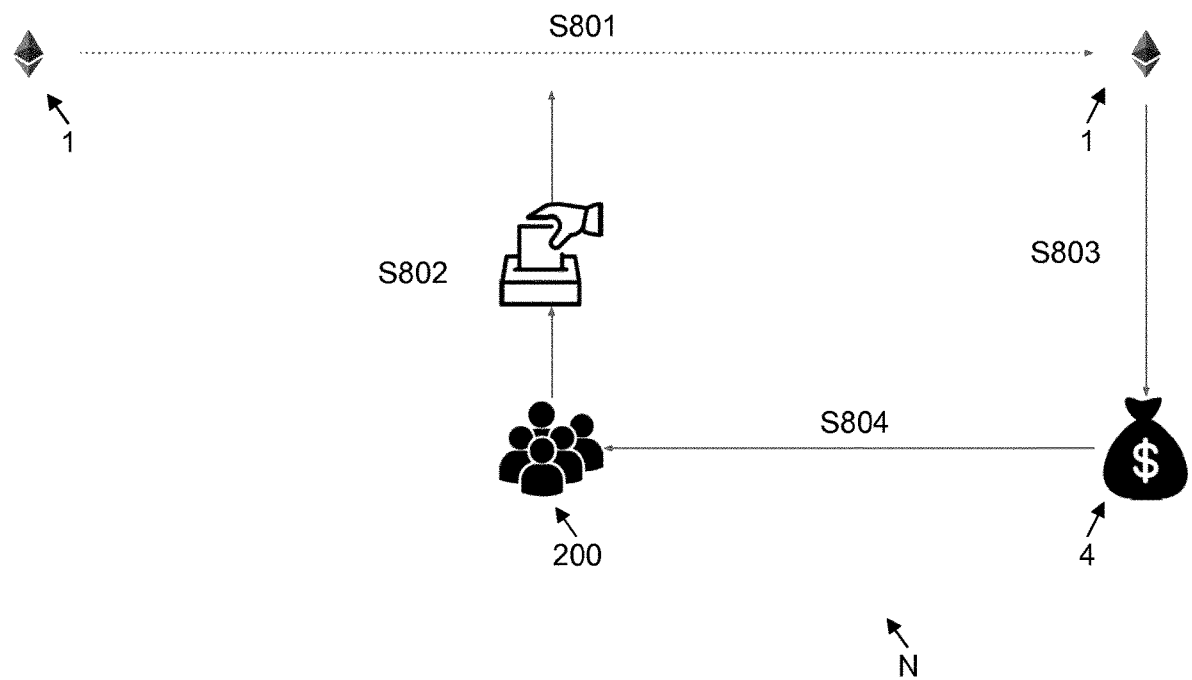
FIG. 8 is a flowchart of part of an example method, in more detail.

FIG. 8 is a flowchart of part of an example method, in more detail. Particularly, FIG. 8 relates to a first scenario, specifically the finding of data unavailability for the transaction TR3 of the settlement transaction TR3.

At S801, if the second set S2 of nodes 200 determine that all the data relating to the settlement transaction TR3 were not available and/or complete, the finding of data unavailability for the transaction TR3 is made, as described previously. In response to the finding of data unavailability for the transaction, data unavailability staking is performed, for example continuously during the dispute period and/or the remaining (i.e. unelapsed) dispute period, by the second set S2 of nodes 200 on the network N i.e. the data unavailability staking is performed by the second set S2 of nodes 200 on the first agent 1 on the network N. The data unavailability staking is performed according to game theory. The second agent 2 defaults to a status 'no data withholding attack is underway' (i.e. a first status).

Particularly, after the dispute period ends without any fraud proof, the second user 100B will then try to finalise their settlement. At this point, the smart contract (i.e. the first agent 1) will check if data were available. This data availability check may be a backstop to the process i.e. the last check before completing the settlement.

At S802, in response to the finding of data unavailability for the transaction, one or more of the second set S2 of nodes 200 respectively stake tokens (for example, an amount of money) that the finding of data unavailability for the transaction TR is correct. These one or more of the second set S2 of nodes 200 (also known as stakers) risk their respective staked tokens in return for respective shares of a possible reward 4 payable to these one or more of the second set S2 of nodes 200 if the finding of data unavailability for the transaction TR is correct.

At S803, if these one or more of the second set S2 of nodes 200 respectively stake tokens that the finding of data unavailability for the transaction TR is correct and an amount of staked tokens reaches a predefined threshold (for example, one or more criteria of agreement), for example by these one or more of the second set S2 of nodes 200 supporting one or more of the remaining second set S2 of nodes 200 (i.e. the users 300N who have not, as yet, respectively staked tokens that the finding of data unavailability for the transaction TR is correct), a determination is made by the first agent 1 that a data withholding attack is underway. In other words, if users support each other and the staking reaches multiple criteria of agreement, then this is considered as proof that data were unavailable and thus that the data withholding attack is underway. The reward will be available to the stakers who are good actors.?

At S804, if these one or more of the second set S2 of nodes 200 (i.e. the stakers), who respectively stake tokens that the finding of data unavailability for the transaction TR is correct, succeed in changing a status of the second agent 2 from the first status 'no data withholding attack is underway' to a second status 'data withholding attack is underway' (i.e. the amount of staked tokens reaches the predefined threshold), these one or more of the second set S2 of nodes 200 (i.e. the stakers) receive respective shares of the reward 3. However, if the status of the second agent 2 is unchanged (i.e. remains the first status 'no data withholding attack is underway'), these one or more of the second set S2 of nodes 200 (i.e. the stakers) may lose their respective staked tokens.

The steps S802, S803 and/or S804 may be repeated one or more times during the dispute period.

Figure 9:
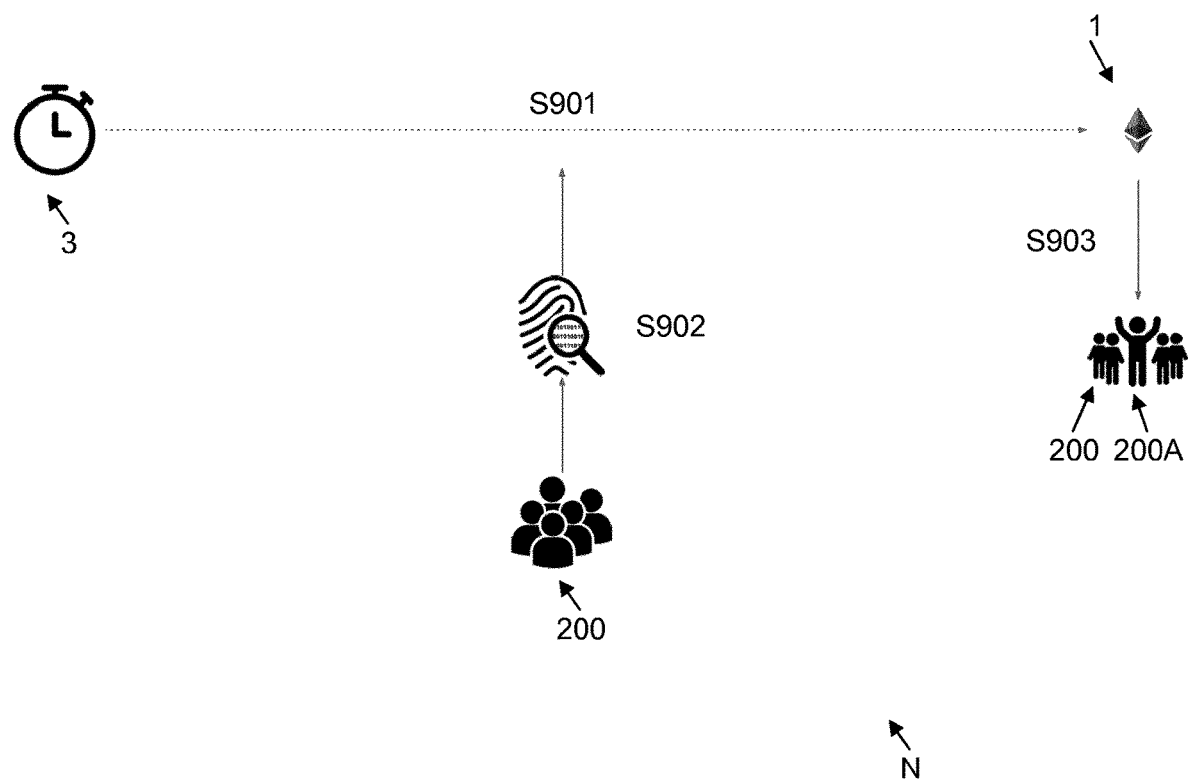
FIG. 9 is a flowchart of part of an example method, in more detail.

FIG. 9 is a flowchart of part of an example method, in more detail. Particularly, FIG. 9 relates to a second scenario, specifically the finding of fraud for the transaction TR of the settlement transaction TR3.

At S901, if the second set S2 of nodes 200 determines that all the data relating to the settlement transaction TR3 were not correct, the finding of fraud for the transaction TR is made, as described previously. In response to the finding of fraud for the transaction, fraud proofing is performed, for example continuously during the dispute period and/or the remaining (i.e. unelapsed) dispute period, by the second set S2 of nodes 200 on the network N i.e. the fraud proofing is performed by the second set S2 of nodes 200 on the first agent 1 on the network N.

At S902, if one or more of the second set S2 of nodes 200 observe that all the data relating to the settlement transaction TR3 were not correct, these one or more of the second set S2 of nodes 200 submit this data as proof of fraud to the first agent 1 on the network N. The first agent 1 on the network N behaves as an adjudicator (for example, a supreme court) regarding the fraud. Particularly, these one or more of the second set S2 of nodes 200 compete or race to submit this data as the proof of the fraud to the first agent 1 on the network N, so as to be the first user 300 to submit this data.

At S903, the first user 300 to submit this data (i.e. evidence of fraud) is rewarded with a part of funds seized from the second user 100B (i.e. from the second account 210 related to the second user 100B).

Figure 10:
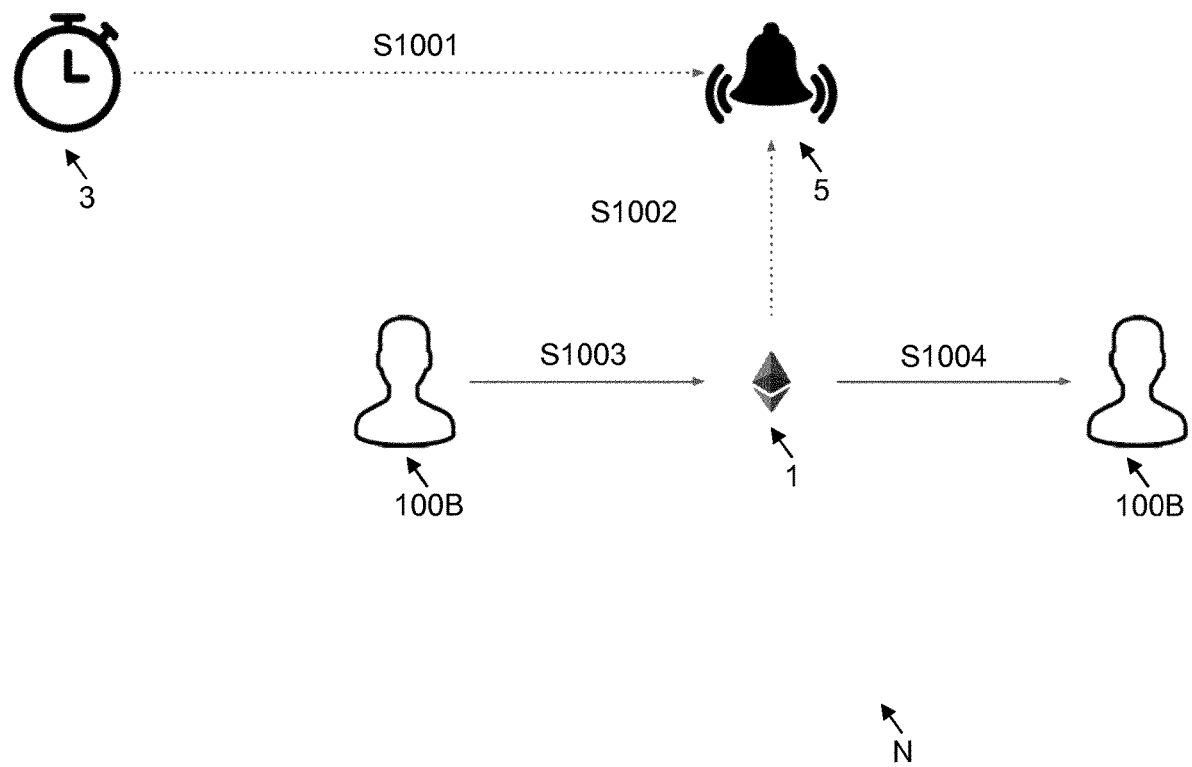
FIG. 10 is a flowchart of part of an example method, in more detail.

FIG. 10 is a flowchart of part of an example method, in more detail. Particularly, FIG. 10 relates to a third scenario, specifically wherein all the data relating to the settlement transaction TR3 are complete and correct.

At S1001, the dispute period elapses (i.e. expires or terminates), as indicated by a limit (a ringing bell) 5. The status of the second agent 2 is unchanged (i.e. remains the first status 'no data withholding attack is underway') and data as proof of fraud have not been submitted to the first agent 1 on the network N. In other words, neither finding of data unavailability for the transaction TR3 nor finding of fraud for the transaction TR3 have been made.

At S1002, the settlement transaction TR3 is processed by the first agent 1 on the network N. Particularly, the first agent 1 on the network N credits the corresponding amount (for example, the same amount) (i.e. the amount corresponding to the payment transaction TR2) to the second account 210, related to the second user 100B.

At S1003, the second user 100B notes, from a balance of the second account 210, for example that the payment transaction TR2 has been processed. The second user 100B transmits a withdrawal request TR4 (i.e. a fourth transactional record) to the first agent 1 on the network N.

At S1004, the first agent 1 on the network N checks that the dispute period has elapsed without problems (i.e. all the data relating to the settlement transaction TR3 are complete and correct) and the first agent 1 on the network N processes the withdrawal request TR4.

Described below is part of an application programming interface (API), as an example embodiment, for nahmii, a scaling solution for the Ethereum block chain. nahmii is a hybrid centralized/decentralized solution that enables instant (micro-) payments, trading and trustless settlements. The API is wrapped by a software development kit (SDK), implemented as a javascript library. LTS version (v8.x) of NodeJS and NPM or later is required. A command line interface (CLI) is also provided, for which Python and a C++ compiler are required. The source code and documentation are available from a GitHub repository at https://github.com/hubiinetwork/, which are incorporated herein by reference in entirety.

A function _settlePayment only results in payment (i.e. a request to execute a transaction) if both a fraudChallenge and a communityVote are true (i.e. determining, by the at least one node of the second set of nodes, completeness of data relating to the transaction by accessing the data from the server and deciding, at least in part, a first result according to the accessed data; and verifying, by the at least one node of the second set of nodes, correctness of the data relating to the transaction by accessing the data from the server and deciding, at least in part, a second result of the verifying according to the accessed data.)

```
function _settlePayment(address wallet, PaymentTypesLib.Payment payment)
    private
    onlySealedPayment(payment)
    onlyPaymentParty(payment, wallet)
    {
        require(!fraudChallenge.isFraudulentPaymentHash(payment.seals.operator.hash));
        require(!communityVote.isDoubleSpenderWallet(wallet));
        // Require that wallet is not locked
        require(!walletLocker.isLocked(wallet));
        // Require that the wallet's current driip settlementchallenge proposal is defined wrt this payment
        require(payment.seals.operator.hash ==
driipSettlementChallengeState.proposalChallengedHash(
            wallet, payment.currency
        ));
        // Extract properties depending on settlement role
        (
        DriipSettlementTypesLib.SettlementRole settlementRole, uint256 walletNonce,
        NahmiiTypesLib.OriginFigure[] memory totalFees, int256 currentBalance
        ) = _getRoleProperties(payment, wallet);
        // Require that driip settlement challenge proposal has beeninitiated
        require(driipSettlementChallengeState.hasProposal(wallet, walletNonce, payment.currency));
        // Require that driip settlement challenge proposal has not beenterminated already
        require(!driipSettlementChallengeState.hasProposalTerminated(wallet, payment.currency));
        // Require that driip settlement challenge proposal hasexpired
        require(driipSettlementChallengeState.hasProposalExpired(wallet, payment.currency));
        // Require that driip settlement challenge proposal qualified
        require(SettlementChallengeTypesLib.Status.Qualified ==
driipSettlementChallengeState.proposalStatus(
            wallet, payment.currency
        ));
        // Require that operational mode is normal and data is available
        require(configuration.isOperationalModeNormal( ) && communityVote.isDataAvailable( ));
        // Init settlement, i.e. create one if no such settlement exists for the double pair of wallets and
nonces
        driipSettlementState.initSettlement(
            PaymentTypesLib.PAYMENT_KIND( ), payment.seals.operator.hash,
            payment.sender.wallet, payment.sender.nonce,
            payment.recipient.wallet, payment.recipient.nonce
        );
        // If exists settlement of nonce then require that wallet has not already settled
        require(!driipSettlementState.isSettlementRoleDone(
            wallet, walletNonce, settlementRole
        ));
        // Set address of origin or target to prevent the same settlement from being resettled by this wallet
        driipSettlementState.setSettlementRoleDone(
            wallet, walletNonce, settlementRole, true
        );
        // If wallet has previously settled balance of the concerned currency with higher wallet nonce,
then don't
        // settle balance again
        if (driipSettlementState.maxNonceByWalletAndCurrency(wallet, payment.currency) <
walletNonce) {
            // Update settled nonce of wallet and currency
            driipSettlementState.setMaxNonceByWalletAndCurrency(wallet, payment.currency,
walletNonce);
            // Update settled balance
            clientFund.updateSettledBalance(
                wallet, currentBalance, payment.currency.ct, payment.currency.id, "", payment.blockNumber
            );
            // Stage (stage function assures positive amount only)
            clientFund.stage(
                wallet, driipSettlementChallengeState.proposalStageAmount(wallet, payment.currency),
                payment.currency.ct, payment.currency.id, ""
            );
        }
        // Stage fees to revenue fund
        if (address(0) != address(revenueFund))
            _stageFees(wallet, totalFees, revenueFund, walletNonce);
        // Remove driip settlement challenge proposal
        driipSettlementChallengeState.terminateProposal(wallet, payment.currency, false);
        // If payment global nonce is beyond max driip nonce then update max driip nonce
        if (payment.nonce > driipSettlementState.maxDriipNonce( ))
            driipSettlementState.setMaxDriipNonce(payment.nonce);
}
```

In more detail, a function challenge validates that a payment is genuine.

```
function challenge(PaymentTypesLib.Payment payment)
    public
    onlyOperationalModeNormal
    onlyOperatorSealedPayment(payment)
    {
        require(validator.isGenuinePaymentWalletHash(payment));
        // Genuineness affected by wallet not having signed the payment
        bool genuineWalletSignature = validator.isGenuineWalletSignature(
            payment.seals.wallet.hash, payment.seals.wallet.signature, payment.sender.wallet
        );
        // Genuineness affected by sender and recipient
        (bool genuineSenderAndFee, bool genuineRecipient) =
        validator.isPaymentCurrencyNonFungible(payment) ?
        (
            validator.isGenuinePaymentSenderOfNonFungible(payment) &&
validator.isGenuinePaymentFeeOfNonFungible(payment),
            validator.isGenuinePaymentRecipientOfNonFungible(payment)
        ) :
        (
            validator.isGenuinePaymentSenderOfFungible(payment) &&
validator.isGenuinePaymentFeeOfFungible(payment),
            validator.isGenuinePaymentRecipientOfFungible(payment)
        );
        // Require existence of fraud signal
        require(!(genuineWalletSignature && genuineSenderAndFee && genuineRecipient));
        // Toggle operational mode exit
        configuration.setOperationalModeExit( );
        // Tag payment (hash) as fraudulent
        fraudChallenge.addFraudulentPaymentHash(payment.seals.operator.hash);
        // Reward stake fraction
        securityBond.rewardFractional(msg.sender, configuration.fraudStakeFraction( ), 0);
        // Lock amount of size equivalent to payment amount of sender
        if (!genuineSenderAndFee)
            walletLocker.lockFungibleByProxy(
                payment.sender.wallet, msg.sender, payment.sender.balances.current,
                payment.currency.ct, payment.currency.id, 0
            );
        // Lock amount of size equivalent to payment amount of recipient
        if (!genuineRecipient)
            walletLocker.lockFungibleByProxy(
                payment.recipient.wallet, msg.sender, payment.recipient.balances.current,
                payment.currency.ct, payment.currency.id, 0
            );
        // Emit event
        emit ChallengeByPaymentEvent(
            payment.seals.operator.hash, msg.sender,
            genuineSenderAndFee ? address(0) : payment.sender.wallet,
            genuineRecipient ? address(0) : payment.recipient.wallet
        );
    }
```

In summary, a network and a method of controlling transactions on a network are described. Particularly, the network is configured to perform a method of controlling transactions thereon. The network includes a first set of nodes, a second set of nodes, a server, a first agent and a second agent. The server is configured to originate a transactional record. The first agent is configured to receive a request to execute the transaction defined by the transactional record. At least one node of the second set of nodes is configured to validate, at least in part, the transaction and decide a first result and a second result relating to completeness and correctness, respectively, of data relating to the transaction. The first agent is configured to query, to the second agent, the first result and/or the second result and to permit the request to based, at least in part, on the first result and/or the second result. Origination, for example creation, of the transactions and execution of the transactions are partitioned (also known as separated or uncoupled), so as to increase efficiency by reducing load on the network. However, to better protect against illegitimate or untrusted transactions, the transactions are validated on the network N prior to execution, thereby upholding security. Execution of the transactions, for example by smart contracts, may add the transactions to blockchains. Thus, it is undesirable to add illegitimate or untrusted transactions to such blockchains, the security and/or integrity of which would be otherwise compromised. In this way, the efficiency of performing transactions may be increased, allowing an increased number of transactions to be performed and/or reduction of resources, while illegitimate or untrusted transactions may be denied, thereby upholding security.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processor circuits. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" may mean including the component(s) specified but is not intended to exclude the presence of other components.

Although a few example embodiments have been shown and described, it will be appreciated by those skilled in the art that various changes and modifications might be made without departing from the scope of the invention, as defined in the appended claims.

The invention claimed is:

1. A network configured to perform a method of controlling blockchain transactions performed thereon, the network comprising:
  a first set of nodes comprising a first node and a second node;
  a second set of nodes communicatively connected to the first set of nodes and arranged in a peer-to-peer computing network and comprising a first agent and a second agent;
  a server communicatively connected to both the first set of nodes and the second set of nodes and configured to manage a blockchain transaction between the first node and the second node, the server being independent of, and separate from, the second set of nodes and comprising:
    a memory; and
    processing circuitry configured to originate a transactional record defining the blockchain transaction between the first node and the second node of the first set of nodes;
  wherein the server is excluded from the peer-to-peer computing network comprising the second set of nodes and is off-chain with respect to one or both of the first and second agents;
  wherein origination of the transactional record defining the blockchain transaction is uncoupled from execution of the blockchain transaction;
  wherein the first agent is configured to receive a request from at least one of the server, the first node, and the second node to execute the blockchain transaction defined by the transactional record originated by the server;
  wherein the server is untrusted by the second set of nodes such that at least one node of the second set of nodes is configured to validate, at least in part, the blockchain transaction, by:
    determining completeness of data relating to the blockchain transaction by accessing the data from the server and determining, at least in part, a first result according to the accessed data; and
    verifying correctness of the data relating to the blockchain transaction by accessing the data from the server and determining, at least in part, a second result of the verifying according to the accessed data;
  wherein the first agent is configured to send a query to the second agent for the first result and/or the second result;
  wherein the second agent is configured to obtain the first result and/or the second result from the second set of nodes, in response to the query;
  wherein the first agent is configured to permit the request to execute the blockchain transaction defined by the transactional record based, at least in part, on the first result and/or the second result; and
  wherein the first agent is further configured to execute the blockchain transaction defined by the transactional record.

2. The network according to claim 1, wherein the processing circuitry is further configured to create the transactional record, and wherein the first node and/or the second node of the first set of nodes is configured to transmit the request to the first agent to execute the blockchain transaction defined by the transactional record.

3. The network according to claim 1, wherein the first agent is further configured to:
  deny the request to execute the blockchain transaction defined by the transactional record if the first result indicates that the data related to the blockchain transaction is incomplete; and
  establish a finding of data unavailability for the blockchain transaction.

4. The network according to claim 1, wherein the first agent is configured to:
  deny the request to execute the blockchain transaction defined by the transactional record if the second result indicates that the data related to the blockchain transaction is incomplete; and
  establish a finding of fraud for the blockchain transaction.

5. The network according to claim 1, wherein a first threshold number of nodes of the second set of nodes is configured to substantiate the completeness of the data related to the blockchain transaction.

6. The network according to claim 1, wherein a second threshold number of nodes of the second set of nodes is configured to prove and/or disprove whether the data related to the blockchain transaction is correct.

7. The network according to claim 1, wherein the first agent is further configured to set a limit for validating the blockchain transaction, in response to receiving the request to execute the blockchain transaction defined by the transactional record, and wherein the at least one node of the second set of nodes is configured to validate the blockchain transaction limited by the limit.

8. The network according to claim 1, wherein the first agent is further configured to perform a remedial action based, at least in part, on the first result and/or the second result.

9. The network according to claim 1, wherein the server is further configured to publish the data related to the blockchain transaction.

10. A method of controlling blockchain transactions on a network including a first set of nodes comprising a first node and a second node, a second set of nodes communicatively connected to the first set of nodes and arranged in a peer-to-peer computing network and comprising a first agent and a second agent, and a server communicatively connected to both the first set of nodes and the second set of nodes, and configured to manage a blockchain transaction between the first node and the second node, the server being independent of, and separate from, the second set of nodes, the method being implemented, at least in part, by hardware of the server including at least processing circuitry and a memory, the method comprising:
- originating, from the server, a transactional record a blockchain transaction between the first node and the second node, wherein the server is excluded from the peer-to-peer computing network comprising the second set of nodes and is off-chain with respect to one or both of the first and second agents, wherein the server is untrusted by the second set of nodes such that at least one node of the second set of nodes is configured to validate, at least in part, the blockchain transaction, and wherein the origination of the transactional record defining the blockchain transaction is uncoupled from execution of the blockchain transaction;
- receiving, by the first agent, a request from at least one of the server, the first node, and the second node to execute the blockchain transaction defined by the transactional record originated by the server;
- validating, by the at least one node of the second set of nodes, at least in part, the blockchain transaction, the validating comprising:
  - determining completeness of data related to the blockchain transaction by accessing the data from the server and determining, at least in part, a first result according to the accessed data; and
  - verifying correctness of the data relating to the blockchain transaction by accessing the data from the server and determining, at least in part, a second result of the verifying according to the accessed data;
- sending, by the first agent to the second agent, a query for the first result and/or the second result;
- responsive to receiving the query, the second agent obtaining, the first result and/or the second result from the second set of nodes;
- permitting, by the first agent, the request to execute the blockchain transaction defined by the transactional record based, at least in part, on the first result and/or the second result; and
- executing, by the first agent, the blockchain transaction defined by the transactional record.

11. The method according to claim 10, wherein originating the transactional record comprises:
- creating, by the server, the transactional record; and
- transmitting, by the first node or the second node of the first set of nodes, the request to execute the blockchain transaction defined by the transactional record.

12. The method according to claim 10, further comprising:
- denying, by the first agent, the request to execute the blockchain transaction defined by the transactional record if the first result indicates that the data related to the blockchain transaction is incomplete; and
- establishing, by the first agent, a finding of data unavailability for the blockchain transaction.

13. The method according to claim 10, further comprising:
- denying, by the first agent, the request to execute the blockchain transaction defined by the transactional record if the second result indicates that the data related to the blockchain transaction is incorrect; and
- establishing, by the first agent, a finding of fraud for the blockchain transaction.

14. The method according to claim 10, wherein determining, by the at least one node of the second set of nodes, the completeness of the data related to the blockchain transaction by accessing the data from the server comprises substantiating, by a first threshold number of nodes of the second set of nodes, the completeness of the data related to the blockchain transaction.

15. The method according to claim 10, wherein verifying, by the at least one node of the second set of nodes, the correctness of the data related to the blockchain transaction by accessing the data from the server comprises proving and/or disproving, by a second threshold number of nodes of the second set of nodes, the correctness of the data relating to the blockchain transaction.

16. The method according to claim 10, further comprising:
- setting, by the first agent, a limit for validating the blockchain transaction, in response to receiving the request to execute the blockchain transaction defined by the transactional record; and
- wherein validating the blockchain transaction is limited by the limit.

17. The method according to claim 10, further comprising performing, by the first agent, a remedial action based, at least in part, on the first result and/or the second result.

18. A tangible non-transitory computer-readable storage medium in a network having a first set of nodes comprising a first node and a second node, a second set of nodes communicatively connected to the first set of nodes and arranged in a peer-to-peer computing network and comprising a first agent and a second agent, and a server comprising processing circuitry and a memory, wherein the server is communicatively connected to both the first set of nodes and the second set of nodes, and is configured to manage a blockchain transaction between the first node and the second node, the server being independent of, and separate from, the second set of nodes, the tangible non-transitory computer-readable storage medium having recorded thereon instructions which, when implemented, at least in part, by processing circuitry of the server, manages blockchain transactions in the network by controlling the network to:
- originate, from the server, a transactional record defining a blockchain transaction between the first node and the second node, wherein the server is excluded from the peer-to-peer computing network comprising the second set of nodes and is off-chain with respect to one or both of the first and second agents, wherein the server is untrusted by the second set of nodes such that at least one node of the second set of nodes is configured to validate, at least in part, the blockchain transaction, and wherein the origination of the transactional record defining the blockchain transaction is uncoupled from execution of the blockchain transaction;
- receive, by the first agent from at least one of the server, the first node, and the second node, a request to execute the blockchain transaction defined by the transactional record originated by the server;
- validate, by the at least one node of the second set of nodes, at least in part, the blockchain transaction, by:
  - determining, by the at least one node of the second set of nodes, completeness of data related to the blockchain transaction by accessing the data from the server and deciding, at least in part, a first result according to the accessed data; and
  - verifying, by the at least one node of the second set of nodes, correctness of the data related to the blockchain transaction by accessing the data from the server and determining, at least in part, a second result of the verifying according to the accessed data;

send, by the first agent to the second agent, a query for the first result and/or the second result;

obtain, by the second agent, the first result and/or the second result from the second set of nodes in response to receiving the query;

permit, by the first agent, the request to execute the blockchain transaction defined by the transactional record based, at least in part, on the first result and/or the second result; and execute, by the first agent, the blockchain transaction defined by the transactional record.

* * * * *